United States Patent [19]

Baillie

[11] Patent Number: 4,486,207

[45] Date of Patent: Dec. 4, 1984

[54] APPARATUS FOR REDUCING ATTRITION OF PARTICULATE MATTER IN A CHEMICAL CONVERSION PROCESS

[75] Inventor: Lloyd A. Baillie, Homewood, Ill.

[73] Assignee: Atlantic Richfield Company, Philadelphia, Pa.

[21] Appl. No.: 451,371

[22] Filed: Dec. 20, 1982

Related U.S. Application Data

[63] Continuation of Ser. No. 275,567, Jun. 22, 1981, abandoned.

[51] Int. Cl.³ .................. B01J 8/24; B01D 45/12; B04C 5/04
[52] U.S. Cl. .......................... 55/455; 55/456; 55/459 R; 55/459 D; 209/144; 422/147
[58] Field of Search .................... 275/567; 422/147; 55/455, 456, 459 R, 459 D; 209/144

[56] References Cited

U.S. PATENT DOCUMENTS

| | | | |
|---|---|---|---|
| 2,654,351 | 10/1953 | Ammon | 55/455 X |
| 3,034,647 | 5/1962 | Giesse | 55/455 X |
| 3,969,096 | 7/1976 | Richard | 55/455 |
| 4,081,249 | 3/1978 | Baillie | 422/147 |
| 4,229,194 | 10/1980 | Baillie | 55/459 R X |
| 4,316,729 | 2/1982 | MacLean et al. | 55/459 R |

Primary Examiner—Barry S. Richman
Attorney, Agent, or Firm—Donald L. Traut

[57] ABSTRACT

An apparatus for separating solid particles from vapor is disclosed. The apparatus includes a novel inlet system, a novel particle outlet system and a chamber having novel dimensional relationships which result in an apparatus that separates solid particles from vapor with less attrition, or "break-up" of particulate matter, while maintaining a high separation efficiency at high loading conditions, e.g., the apparatus maintains a tangential wall velocity of less than about 50 feet per second and separates, from a mixture of solid particles and vapor, more than about 95% of the solid particles that are larger than about 20 microns in diameter while processing more than about 200 cubic feet of the mixture per second.

This apparatus is particularly suited to at least partially seperating solid particles from a mixture of vapors and solid particles, the mixture being of the type which arises when restoring the catalytic activity of solid particles previously used to promote or carry out a chemical conversion such as hydrocarbon cracking.

21 Claims, 8 Drawing Figures

APPARATUS FOR REDUCING ATTRITION OF PARTICULATE MATTER IN A CHEMICAL CONVERSION PROCESS

This is a continuation of application Ser. No. 275,567 filed June 22, 1981 (now abandoned).

BACKGROUND OF THE INVENTION

This invention relates to an improved apparatus and method for restoring catalytic activity of solid particles previously used to promote chemical conversion processes. More particularly, the invention relates to a method and apparatus for separating, at high temperatures, solid particulate matter, used in promoting hydrocarbon conversions, from a mixture of vapor and solid particulate matter. The invention provides a technique for maintaining both high separation efficiency and low particulate attrition at high loading conditions.

In many instances throughout the chemical and hydrocarbon processing industries, chemical reactions occur which are promoted by relatively small catalyst particles in fluidized bed catalytic reactions (e.g., catalyst diameters ranging from about 10 microns to about 500 microns.) One process used extensively in the petroleum industry which utilizes small catalyst particles is the catalytic cracking of higher boiling hydrocarbons to gasoline and other lower boiling components. The apparatus used for carrying out this chemical conversion (e.g., cracking of a feedstock) or reforming (e.g., hydrocarbon gas oil) includes a reaction zone where the relatively small catalyst particles and feedstock are contacted at chemical conversion (e.g., hydrocarbon cracking or reforming etc.) conditions to form at least one chemical conversion product (e.g., hydrocarbons having a lower boiling point than the hydrocarbon feedstock and/or a higher octane rating.)

Often, while promoting the desired chemical conversion, the catalyst particles have deposited thereon carbonaceous materials such as carbon, coke and the like which act to reduce the catalytic activity of these particles. Apparatus which is used to restore the catalytic activity of such particles often includes a regeneration zone where the deposit-containing solid particles are contacted with oxygen-containing vapor at conditions to combust at least a portion of such deposited material.

Operation of each of the systems referred to above involves the formation of a mixture of solid particles and vapor followed at some point in time with a separation of at least a portion of the solid particles from the vapor-particle mixture. Therefore, both the apparatus for carrying out chemical conversion and the apparatus for restoring the catalytic activity of the solid catalyst particles include at least one separation apparatus wherein the mixture of solid particles and vapor formed in either a reaction or a regeneration zone, respectively, is at least partially separated. Such separation apparatus often involves a conventional cyclone precipitator or separator.

Processing solid catalyst particles through cyclone precipitators may cause the solid catalyst particles to break up and/or form "fines" by attrition. The resulting particle fines are often of such a size that they cannot be effectively separated from the vapor, and are lost from the system. This results in the loss of valuable catalyst and the discharge of potential air pollutants. Accordingly, it is advantageous to provide for a cyclone having low or reduced rates of attrition of the solid catalyst particles.

"Attrition" generally refers to the fraction of solid particles which are converted to less than about 20 microns[1] in average diameter as a result of one or more collisions between solid particles, alone or in connection with a solid cyclone wall or other surface. A cyclone with "low attrition" is one in which less than about $3.0 \times 10^{-6}$ of all catalyst particles are converted to less than about 20 micron size during a separation of particles from vapor therein.

[1] As used herein, a "micron" is equivalent to one micrometer, or $10^{-6}$ meter.

In addition to low attrition, cyclones preferably have a high separation efficiency, e.g., an efficiency in separating from the mixture of solid particles and vapor about 95–99% of the solid particles larger than about 20 microns in diameter. However, conventional cyclone separation art teaches that in scaling a cyclone for high loading conditions (e.g., processing a stream having a high volumetric flow rate "F", typically on the order of about 200–600 cubic feet of fluid per second) either high separation efficiency or low attrition must be sacrificed. Engineers faced with the problem of specifying the dimensions of a cyclone for high loading conditions try for optimum balance in the trade-off between separation efficiency and attrition.

In order to attain both high separation efficiency and low attrition, the prior art has required that smaller sized cyclones should be used. The rationale for this position is based upon a relatively complex relationship between the flow patterns inside the cyclone, the tangential velocity of the particle at the cyclone wall and the effect of collisions between the cyclone wall and the solid particles. For example, in order to provide high separation efficiency, the gas revolution velocity (and thus the motion of the solid particles toward the outer walls) should be high. However, high centrifugal forces create strong friction forces between the solid particles and the cyclone wall, and these strong friction forces coupled with high tangential velocities at the cyclone wall increase the rate of attrition. In order to provide low attrition, the tangential wall velocity should be low. However, lower tangential velocities in conventional cyclones designed for high loading conditions are typically achieved by reducing the velocity of gas revolutions, which, in turn, reduces separation efficiency. Thus arises the trade-off between separation efficiency and attrition. The use of smaller sized cyclones minimizes the disadvantageous trade-off because smaller radius cyclones provide greater centrifugal forces at relatively slower tangential velocities.

The use of smaller sized cyclones leads to further complications, particularly in the high volume applications which characterize many industries and the petroleum industry in particular. For example, the smaller sized cyclones have a smaller operating capacity. In order to process a product stream of a given size, two or more smaller sized cyclones must be used in the place of one larger sized cyclone. The smaller sized cyclones in such situation are typically set up in parallel operation with the product stream divided between them, resulting in a more complex and more expensive design. Importantly, the use of multiple, smaller cyclones results in a more space consuming design than a single larger cyclone.

In some situations, the option of using several smaller sized cyclones may not be available as a practical matter because the necessary amount of space does not exist. Inadequate space is especially likely to present a problem where new cyclones are being installed to upgrade an existing facility; the available space in the old facility may not adequately accommodate several, smaller new cyclones. Frequently, even in new chemical processing plants, the amount of space provided for restoration of the catalytic particles is inadequate to effectively allow using the smaller sized units, assuming that such a choice were otherwise practicable.

Heretofore, no adequate alternative choice for providing a high capacity, high efficiency, low attrition cyclone or restoration method, particularly one operable within commonly available space limitations, has been available. The present invention provides a solution to this problem.

SUMMARY OF THE INVENTION

One object of the present invention is to provide an apparatus and method for carrying out chemical conversions (e.g., cracking or reforming) of a feedstock (e.g., hydrocarbon) using solid catalyst particles to promote the conversion, which provides both high separation efficiency and low particle attrition at high loading conditions.

Another object of the present invention is to provide an improved apparatus and method for restoring the catalytic activity (e.g., for hydrocarbon cracking or reforming) of solid catalyst particles, which provides both high separation efficiency and low particle attrition at high loading conditions and high temperatures.

Still another object of the present invention is to provide an improved method and apparatus for separating particulate matter from vapor which provides both high separation efficiency and low attrition at high loading conditions.

A further object of the present invention is to provide a method and apparatus which accomplishes separation of solid catalyst particles from vapor with relatively reduced space requirements.

Yet another object of the present invention is to provide an improved fluid inlet to a cyclone which provides reduced particulate attrition during the introduction of a particulate matter/vapor mixture into the cyclone chamber at high velocity.

Yet still a further object of the present invention is to provide a vortex reflecting and centering device for preventing the re-entrainment of particulate matter that has been effectively separated from a particulate matter/vapor mixture in a cyclone and for adjusting the location of a vortex in a cyclone.

Other objects of this invention are clear to one of skill in the art based upon the teachings of this specification.

In one embodiment, the present invention involves an improved apparatus for carrying out a chemical conversion of a feedstock. This apparatus includes a chemical reaction zone wherein the feedstock (e.g., a substantially hydrocarbon material) is contacted with solid particles capable of promoting chemical conversion (e.g., hydrocarbon cracking) at chemical conversion conditions to form at least one chemical conversion product and a mixture of solid particles and vapor. The major portion of the solid particles, preferably at least about 90% by weight thereof, has a diameter in the range from about 10 microns to about 500 microns, preferably from about 20 microns to about 200 microns. At least one separation device in fluid communication with the reaction zone is provided to at least partially separate the mixture of solid particles and vapor. The separation device comprises a chamber defined by an interior surface which can be of a variety of shapes, cylindrical being preferred, and an inlet to introduce a fluid stream mixture of solid particles and vapor into the chamber in fluid communication between the reaction zone and the chamber. The inlet is situated so that movement of the fluid stream mixture within the chamber causes the solid particles to preferentially move, in vortex fashion, toward the interior surface. The separation device also includes an outlet for particles from the chamber which allows at least a portion of the solid particles that have been effectively separated from the vapor and collected along the interior surface to exit from the chamber; and a fluid outlet from the chamber, which allows at least a portion of the separated vapor component of the mixture to exit from the chamber.

The separation device of the present invention involves a chamber, an inlet and fluid outlet characterized by novel dimensions and dimensional relationships to provide low attrition and high separation efficiency, particularly at high loading conditions. These unique dimensions and dimensional relationships are defined in detail later.

An improved method of chemical conversion (e.g., hydrocarbon cracking or reforming) utilizing such improved apparatus has also been developed.

In an additional embodiment, the present invention involves an apparatus for restoring the catalytic activity of solid particles which have previously been used to promote chemical conversion (e.g., hydrocarbon cracking) and have deactivating carbonaceous material deposited thereon, the major portion, preferably at least about 90% by weight of the solid particles having diameters in the range from about 10 microns to about 500 microns, preferably from about 20 microns to about 200 microns. This apparatus includes a regeneration zone wherein solid particles having deactivating deposits thereon are contacted with oxygen-containing vapor under conditions sufficient to combust at least a portion of the deposits and to form a mixture of solid particles and vapor having a high volumetric flow rate. The regeneration zone is in fluid communication with at least one separation device wherein at least a portion of the solid particles are separated from the mixture. The separation device comprises a chamber defined by an interior surface and an inlet to allow entry of the fluid stream mixture from the regeneration zone into the chamber. The inlet is situated so that movement of the fluid stream mixture within the chamber causes solid particles to preferentially move in vortex fashion toward the interior surface. The separation device also has (1) a particle outlet to allow at least a portion of the solid particles of the mixture that have effectively separated from the vapor and collected along the interior surface to exit from the chamber and (2) a fluid outlet from the chamber to allow at least a portion of the separated vapor component of the mixture to exit from the chamber. The separation device of this embodiment also includes the novel dimensions and dimensional relationships which, as previously mentioned, will be defined later.

An improved method for restoring the catalytic activity of solid particles utilizing this improved apparatus has also been developed.

The apparatus of the present invention includes at least one separation device. However, the apparatus often involves staged separators, e.g., two or more separators in series. The second and following separators, if any, are in fluid communication with the first or previous separators, if any, and receive a fluid product therefrom for further processing. However, the present improved separator can advantageously be used as either the first and/or succeeding separator in such a series.

The reaction zone and the regeneration zone can each have a volume as great as about 100,000 cubic feet or more, preferably from about 20,000 cubic feet to about 50,000 cubic feet. Different sized reactions zones and regeneration zones produce different amounts of particulate matter/vapor mixture, and the separation devices of this invention should be sized according to the volume of product generated by the preceding unit.

The separation device of the present invention is designed to separate particulate matter from a fluid stream mixture of vapor and particulate matter at high loading conditions, e.g., the stream has a high volumetric flow rate "F" of at least 200 cubic feet per second, preferably not in excess of about 600 cubic feet per second and still more preferably between about 200 and about 600 cubic feet per second. As mentioned, the separation device includes a body, a fluid inlet, a fluid outlet and a particle outlet.

The body of the separation device defines a chamber of radius "$R_w$" and height "h". In preferred form, the body includes an upright cylindrical wall portion, a bottom portion and a top portion. The chamber also includes a central axis, a radius "$R_w$" equal to the distance between the central axis and the cylindrical wall portion, and a height "h" equal to the average distance between the fluid outlet and the bottom portion along a line substantially parallel to the central axis.

The fluid inlet permits the introduction of the first fluid stream into the chamber. The inlet is secured to the body and includes an inlet area "$A_i$" and an inlet radius "$R_i$". In one embodiment, the inlet includes a conduit in fluid communication with the source of vapor and particulate matter mixture, preferably the reaction zone or the regeneration zone, and with the chamber. The conduit defines an inlet opening having a predetermined cross-sectional area. Although the inlet conduit may discharge into the chamber from any convenient angle, the inlet conduit preferably empties either substantially parallel to the central axis of the chamber (e.g., a top inlet to a chamber positioned so that the central axis of the conduit is substantially vertical) or substantially tangential to the interior surface of the chamber. In a preferred embodiment, the inlet area "$A_i$" equals the cross-sectional area of the inlet opening, and the inlet radius "$R_i$" equals the average distance between the inlet opening and the central axis.

The fluid outlet permits the withdrawal of a second fluid stream from the chamber. The fluid outlet is secured to the body of the separation device and includes a fluid outlet area "$A_o$" and a fluid outlet radius "$R_o$". In one embodiment the fluid outlet includes a conduit in fluid communication with the chamber and either a second separation device or a further processing unit, thereby defining a fluid outlet opening. The conduit preferably extends from the chamber substantially parallel to and concentric with the central axis of the chamber. In a preferred embodiment, the fluid outlet area "$A_o$", equals the cross-sectional area of the conduit at the outlet opening, and the fluid outlet radius "$R_o$" equals the average distance between the fluid outlet opening and the central axis.

The particle outlet permits the withdrawal of particulate matter from the chamber. The particle outlet is secured to the body and communicates with the chamber.

The separation device of the present invention is characterized by satisfying all of the following conditions:

(1) $R_i h/R_w^{0.89}$ is less than about 11 ft$^{1.1}$; and preferably less than about 9 ft$^{1.1}$;
(2) $R_i A_i$ is greater than about 16 ft$^3$; and preferably greater than about 19 ft$^3$; and
(3) $hA_i$ is greater than about 56 ft$^3$; and preferably greater than about 67 ft$^3$.

A separation device having the indicated dimensional relationships provides low attrition, high separation efficiency of particulate matter and high space efficiency at high loading conditions.

As noted, the sepration device of the present invention is preferably directed to applications involving high loading conditions, e.g. conditions that involve a volumetric flow rate "F" of between about 200 and about 600 cubic feet per second. Conventional cyclones intended for comparable flow rates having high loading conditions can be characterized by a chamber radius "$R_w$", which is less than about 3 feet. The previously defined relationships for the separation device of the present invention are significantly different than the ratios for conventional cyclones intended for comparable high loading conditions.

In addition to its unique dimensional ratios, the separation device of the present invention is also characterized by its unique ability to provide a low rate of attrition and a high rate of separation efficiency at high loading conditions. The invention provides novel relationships for determining the dimensions of certain elements (e.g., "$R_w$", "h", "$A_i$", "$R_i$" and "$R_o$") in relation to the operating parameters for the device. In order to more fully understand these relationships, it is necessary to first discuss the techniques used to determine low attrition and high separation efficiency.

As previously mentioned, low attrition is conventionally defined in relation to a separation operation wherein less than about $3.0 \times 10^{-6}$ fraction of solid particles which collide with the cyclone interior surface are converted to fines of less than about 20 micron size. A more practical definition of low attrition has been developed in connection with the present invention, namely, that low attrition for catalyst particles used to promote hydrocarbon conversion exists if the separation of the catalyst particles involves a tangential wall velocity "$V_w$", within the cyclone less than about 50 feet per second, preferably less than about 40 feet per second. It has been found in connection with this invention that the maintenance of such tangential wall velocities in the cyclone provides acceptable low attrition when dealing with catalyst particles used to promote hydrocarbon conversion.

Similarly, high separation efficiency for first stage cyclones may be defined in relation to the capability of separating from a mixture of solid particles and vapor about 95–99% of the solid particles having a mean particle size greater than about 20 microns. However, a more practical definition of high separation efficiency has been developed in connection with the present invention. For purposes herein, high separation efficiency is characterized by a separation device which operates with a critical particle diameter "D", of less than about 12 microns, preferably between 8 and about 12 microns and most preferably between about 9 and 11 microns. In order to understand and define the concept of "critical particle diameter", it is necessary to review the operation of a cyclone in somewhat greater detail.

The fluid inlet introduces the fluid mixture into the cyclone and, in combination with the cyclone wall and fluid outlet, transforms linear flow into helical or vortex flow. Once the fluid mixture leaves the inlet, a vortex is established within the cyclone having an axial component in the direction of the particle outlet, and a tangential component perpendicular to the chambers' radius "$R_w$".

The cyclone separates particles from vapor by means of the centrifugal force which is exerted on the solid particles by the circular pattern of vortex flow. This force tends to drive the particles to the wall of the cyclone body where they are no longer entrained in the mixture and collect with other particles. The magnitude of the centrifugal force depends upon the nature of the vortex flow in different sections of the cyclone. Counteracting forces, caused by the radially inward flow of vapor exiting the fluid outlet, tend to offset the separating centrifugal forces. The particles at the wall move toward the particle outlet by virtue of the axial component of the vortex flow, aided, if the axis is vertical, by gravity.

However, solid particles within the core of the vortex and particularly those near the fluid outlet are more greatly effected by the counteracting forces of the inward radial gas flow, and such particles tend to be entrained in the fluid outlet stream. The magnitude of these counteracting forces are primarily related to the shape and surface area of the solid particles and the viscosity and velocity of the inward radial gas flow. Critical particle diameter refers to a solid particle, assumed to be of spherical shape, having a size such that the particle has a 50-50 chance of being entrained in the fluid outlet stream when the particle is at a point immediately adjacent the fluid outlet. it has been found in connection with this invention that suitably high separation efficiency of catalyst particles used to promote hydrocarbon conversion is provided by a separation means that operates with a critical particle diameter "D" of between about 8 and about 12 microns.

The critical features of the present separation device, the chamber radius "$R_w$", chamber height "h", inlet area "$A_i$", inlet radius "$R_i$", and outlet radius "$R_o$" are calculated from the operating parameters, volumetric flow rate "F", tangential wall velocity "$V_w$", and critical particle size "D" according to the following equations:

$$R_w = K_i[K_a V_w]^{-1.25}[D\sqrt{d/n}\ ]^{-0.727} F^{\frac{1}{2}}; \quad (4)$$

$$h = K_h[D\sqrt{d/n}\ ]^{-0.323} F^{\frac{1}{2}}; \quad (5)$$

$$A_i = K_a[D\sqrt{d/n}\ ]^{0.323} F^{\frac{1}{2}}; \quad (6)$$

$$R_i = K_i[D\sqrt{d/n}\ ]^{-0.323} F^{\frac{1}{2}}; \text{ and} \quad (7)$$

$$R_o = K_o[D\sqrt{d/n}\ ]^{0.323} F^{\frac{1}{2}}; \quad (8)$$

where:
$K_i$ = about 3.8
$K_a$ = about 0.016
$K_h$ = about 14
$K_o$ = about 0.017 and where "d" and "n" are constants equal to the density of the particulate matter and the viscosity of the particulate matter/vapor mixture, respectively. The critical particle size "D", can be calculated as follows:

$$D = 16920\sqrt{n/d}\ (R_o/R_i)^n A_i/\sqrt{Fh}\ . \quad (9)$$

More specifically, according to the present invention the separation means includes a chamber radius "$R_w$", of between about 4 feet to about 10 feet or more, preferably from about 4 feet to about 6 feet, and a height "h", ranging from about 4 feet to about 50 feet or more, preferably from about 5 feet to about 20 feet, and most preferably from about 5 feet to about 12 feet. The separation apparatus further includes an inlet area "$A_i$", of between about 4 feet$^2$ and about 12 feet$^2$, an inlet radius "$R_i$", of between about 2.5 feet and about 7 feet, and an outlet radius "$R_o$", of between about 0.5 and about 2 feet.

A separation device designed according to the present invention for a particular application has specific dimensions calculated generally according to Relationships 4-8. Although the prior art may include a cyclone having certain features with certain dimensions that may fall within these relationships, the present invention, in contrast to the prior art, requires that all of the dimensions fall within the ranges of these equations.

In addition to the advantageous operating parameters previously described, another advantage of determining the dimensions of the separator means according to Relationships 4-8 is that the separation device operates substantially independently of temperature. That is, the separation device of this invention provides consistent separation over a wide range of operating temperatures. This advantage is in contrast to known prior art which teach that the size of a separation device should be adjusted for significant operating temperature changes. See, Alexander, R. M. Proc. Austral. Inst. Min. Met., (N.S.), Vol. 152 (1949).

In another embodiment, the present invention comprises an improved inlet which introduces the particulate matter/vapor mixture into the chamber at a high velocity and in a predetermined direction while minimizing contact of the solid particles with any solid surface, thereby increasing contrifugal forces and separation efficiency while minimizing attrition attributable to the inlet flow. The inlet comprises a plurality of inlet vanes which divide the inlet fluid mixture into a plurality of high velocity inlet streams, at least one inlet stream being associated with each vane. The inlet vanes are preferably positioned symmetrically about the body. The inlet stream associated with each inlet vane deflects other inlet streams associated with adjacent inlet vanes to induce particles contained therein to move away from any solid surface, for example, the body of the chamber wall or any adjacent inlet vanes. For example, the inlet stream associated with a first inlet vane is deflected away from any solid surface by an inlet stream associated with a second adjacent inlet vane, and the second by a third adjacent inlet and so on. In this manner, each inlet minimizes contact of the particulate matter with the body wall or other solid objects and thus facilitates high centrifugal force and high separation efficiency while minimizing or reducing particle attrition.

Preferably, there are at best, three suitably arranged inlet vanes in order to minimize contact of solid particles with solid surfaces, and more preferably at least about 4, and still more preferably at least about 5. Generally, anywhere from about 5 to about 12 suitably arranged inlet vanes are useful in this invention.

In still another aspect, the separation device of the invention comprises a vortex reflector which includes a plate member, connected to the body, that divides the chamber into a separation zone and a collection zone and a reflecting disk mounted within the separation zone of the chamber directly between the plate member and the fluid outlet. The vortex reflector prevents particulate matter that has been separated from the mixture from being re-entrained along the bottom of the cyclone chamber and into the fluid outlet stream. The reflecting disk preferably has an area which is at least substantially equal to the area of the outlet means.

Although the present invention is useful in many chemical conversions and catalyst regenerations, the apparatus and methods of this invention find particular applicability in systems for the catalytic cracking of hydrocarbons and the regeneration of catalysts so employed. Such catalytic hydrocarbon cracking often involves converting (i.e., cracking) heavier or higher boiling hydrocarbons to gasoline and other lower boiling components, such as hexare, hexene, pentane, pentene, butane, butylene, propane, propylene, ethane, ethylene, methane and mixtures thereof. The substantially hydrocarbon feedstocks typically comprises a gas oil fraction, e.g., derived from petroleum, shale oil, tar sand oil, coal and the like. Such feedstock may comprise a mixture of straight run, e.g. virgin, gas oil. Such gas oil fractions often boil primarily in the range from about 400° F. to about 1000° F. Other substantially hydrocarbon feedstocks (e.g., other high boiling or heavy fractions of petroleum, shale oil, tar sand oil, coal and the like) can be cracked using the apparatus and method of the present invention. Such substantially hydrocarbon feedstocks often contain minor amounts of contaminants, e.g., sulfur, nitrogen and the like.

Hydrocarbon cracking conditions are well known and often include temperatures from about 850° F. to about 1100° F., preferably from about 900° F. to about 1050° F. Other reaction conditions usually include pressures of up to about 100 psig.; catalyst to oil ratios of from about 5 to 1 to about 25 to 1; and weight hourly space velocities (weight of catalyst/weight of hydrocarbon feedstock/hour) of from about 3 to about 60. These hydrocarbon cracking conditions are not critical to the present invention and can be varied depending, for example, on the feedstock and catalyst being used and the product wanted. The hydrocarbon cracking reaction is generally conducted in the essential absence of added free molecular hydrogen.

In addition, the catalytic hydrocarbon cracking system includes an apparatus for restoring the catalytic activity of catalyst particles previously used to promote hydrocarbon cracking. This apparatus involves a catalyst regeneration zone into which at least a portion of the catalyst from the cracking reaction zone in withdrawn. Such catalyst is contacted with free oxygen-containing gas in the regeneration zone to restore or maintain the activity of the catalyst by removing (e.g., by combusting) carbonaceous material deposited on the catalyst particles. The combustion gas temperature in the regeneration zone is generally from about 900° F. to about 1500° F., preferably from about 900° F. to about 1300° F. At least a portion of the regenerated catalyst is returned or recycled to the hydrocarbon cracking reaction zone.

The catalyst particles useful in the catalytic hydrocarbon cracking embodiment of the present invention can be any conventional catalyst capable of promoting hydrocarbon cracking at the conditions present in the reaction zone, i.e., hydrocarbon cracking conditions. Similarly, the catalytic activity of such particles is restored at the conditions present in the regeneration zone. Typical among these conventional catalyst are those which comprise alumina, silica, silica-alumina and at least one crystalline alumino-silicate having pore diameters of from about 8 Å to about 15 Å and mixtures thereof. Because of the increased economic incentive for maintaining the particle size of a zeolite-containing catalyst, it is preferred that the catalyst particles comprise from about 1% to about 50%, more preferably from about 5% to about 25%, by weight of at least one crystalline alumino-silicate having a pore diameter of from about 8 Å to about 15 Å. At least a portion of the alumina, silica, silica-alumina and crystalline alumino-silicate may be replaced by clays which are conventionally used in hydrocarbon cracking catalyst compositions. Typical examples of these clays include halloyside, or dehydrated halloyside (kaolinite), montmorillonite, bentonite and mixtures thereof. These catalyst compositions can also contain minor amounts of other inorganic oxides such as magnesia, zirconia, etc. The compositions may also include minor amounts of conventional combustion promoters such as the rare earth metals, in particular, cerium. Such catalyst compositions are commercially available in the form of relatively small particles, e.g., having diameters in the range from about 10 microns to about 500 microns, preferably from about 20 microns to about 200 microns.

In general, and except as otherwise provided for herein, the apparatus of the present invention can be fabricated from any suitable material or combination of materials of construction. The material or materials of construction used for each component of the present apparatus depend upon the particular application involved. Of course, the apparatus should be made of materials which are substantially unaffected either physically or chemically, except for normal wear and tear, by the conditions at which the apparatus is normally operated. In general, such material or materials should have no substantial detrimental effect on the feedstock being chemically converted, the chemical conversion product or products or the catalyst being employed.

These and other aspects, objects and advantages of the present invention are set forth in the following detailed description and claims, particularly when considered in conjunction with the accompanying drawings in which like parts bear like reference numerals.

BRIEF DESCRIPTION OF THE DRAWING

In the following detailed description reference will be made to the following figures.

DETAILED DESCRIPTION OF THE PREFERRED EMBODIMENT

Figure 1:
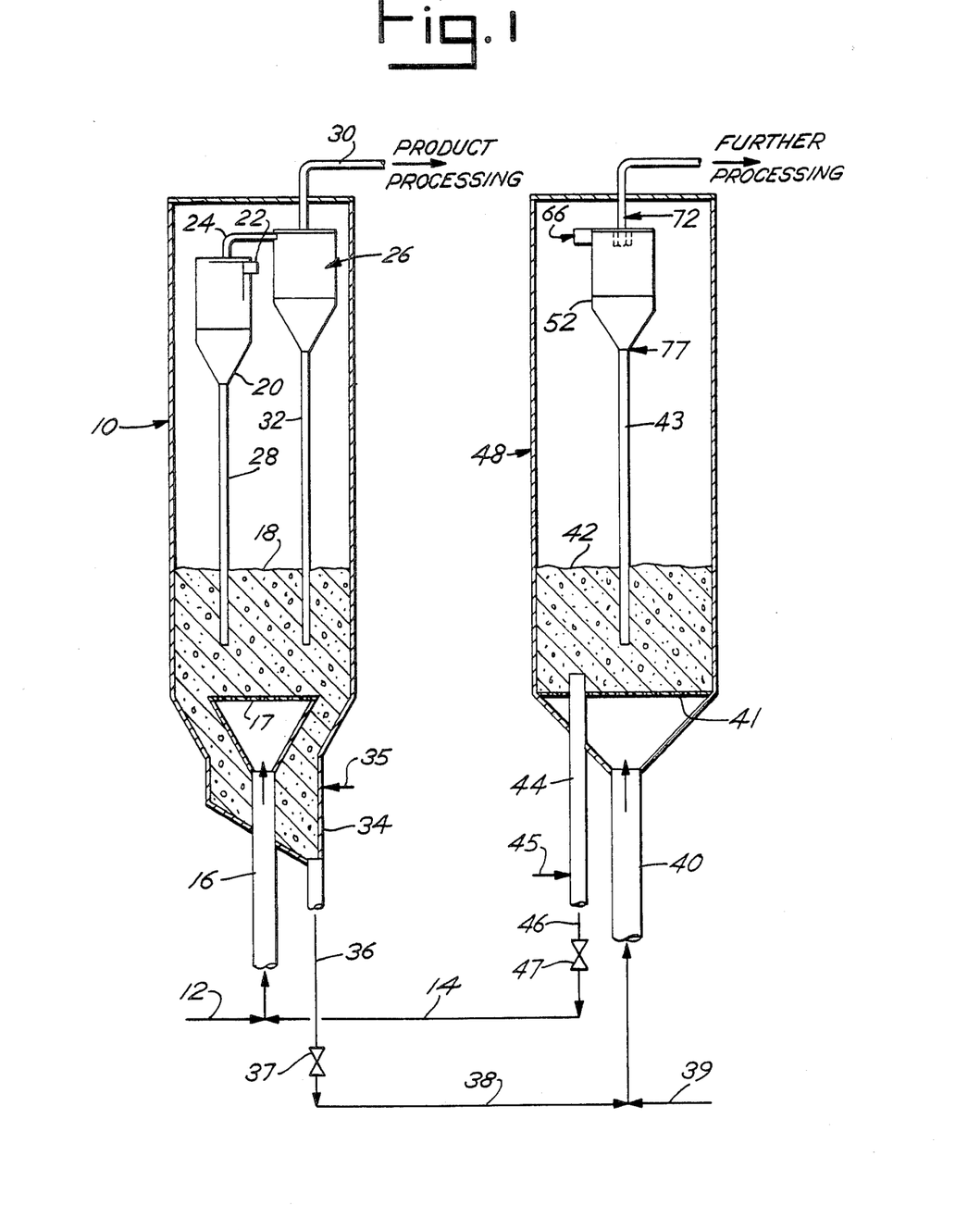
FIG. 1 is a simplified schematic view of a fluid bed catalytic hydrocarbon cracking reactor-regeneration system.

Referring to FIG. 1 there is schematically illustrated a catalytic hydrocarbon conversion reactor-regenerator system, including a reactor 10, inlet riser 16, first separator 20, second separator 26, stripper 34, regenerator 48, riser 40, separator 52 and stand pipe 44. Although the FIGURES and the following description are directed particularly to a preferred embodiment of the present invention, catalytic hydrocarbon cracking, the present invention may be readily adapted to apparatus and methods for other chemical conversions and catalyst regenerations by those skilled in the art.

Reactor 10 provides the required space for catalytic hydrocarbon cracking to occur. Preheated hydrocarbon feedstock, e.g., petroleum derived gas oil, entering from line 12 is combined with catalyst particles, e.g., more than 90% by weight of such particles having diameters greater than about 20 microns, entering from line 14. The mixture of feedstock and catalyst flows upward through riser 16 where a portion of the catalytic hydrocarbon cracking takes place and out through a diffuser 17, e.g., a plate with holes positioned at the top of riser 16, into reactor 10. The feedstock catalyst and cracked products form a dense fluid bed below level 18. The particulate matter/vapor mixture in reactor 10 above level 18 comprising cracked products, unreacted feedstock and catalyst particles is in the form of a lean fluid. This lean fluid enters first separator 20 tangentially through an inlet 22 to separate a portion of the solid particles in the lean fluid from the remainder of the solid catalyst particulate matter/vapor mixture, which is sent through a line 24 to second separator 26. The separated solid particles from first separator 20 flow down through a first dip leg 28 to the dense fluid bed below level 18. The solid particulate matter/vapor mixture in line 24 is conveyed to the top of second separator 26 which acts to further separate solid particles from the vapor. Vapor from second separator 26 exits through a line 30 and is sent to product processing, e.g., fractionation or other chemical reactions and the like, to produce a final saleable product. The vapor in line 30 may also require additional processing by using techniques well known to one of ordinary skill in the art to remove any remaining solid particles. The separated solid particles leave second separator 26 by second dip leg 32 which exits below lever 18 of the dense fluid bed.

Solid particles of catalyst having a carbonaceous deposit thereon as a result of the conversion reaction are withdrawn from the bottom of reactor 10 through stripper 34. A stripping gas, e.g., steam, enters first stripper 34 through line 35 and acts to strip hydrocarbon from the solid particles before they exit from reactor 10. The stripped solid catalyst particles exiting from first stripper 34 flow through a line 36, valve 37, and line 38 where they are combined with an oxygen-containing gas, e.g., air, entering via line 39. The resulting mixture of the solid catalyst particles having a carbonaceous deposit thereon and the oxygen-containing gas flow through a riser or pipe 40 through a diffusion plate 41, e.g., a plate with holes, into regenerator 48 containing a fluidized bed of catalyst 42. At least a portion of the carbonaceous deposit on the solid catalyst particles in regenerator 48 is removed by combustion with the oxygen-containing gas. The lean fluid above the catalyst bed 42 in regenerator 48 is a mixture of solid catalyst particles and vapor. This lean fluid enters separator 52 via an inlet 66 as shown in greater detail in FIG. 2 wherein the lean fluid is separated into a vapor stream and a solid catalyst stream. The vapor exits separator 52 through fluid outlet 72, and the stream of solid catalyst particles exit separator 52 through particle outlet 77 for return through third dip leg 43 to fluid bed 42. The vapor from fluid outlet 72, which includes combustion flue gases, may be released to the atmosphere or further processed according to techniques well known to those of ordinary skill in the art to remove any remaining solid particles.

Regenerated catalyst solid particles, i.e. catalyst particles which have had catalytic activity at least partially restored by removal of carbonaceous deposit, are removed from fluid bed 42 of regenerator 48 down through a standpipe 44. As the solid catalyst particles pass through standpipe 44, a fluidizing gas, e.g., steam entering from line 45, contacts the solid particles, thereby fluidizing the solid particles in standpipe 44 and stripping any remaining oxygen-containing gas from the solid particles. The thus fluidized stripped solid catalyst particles flow from standpipe 44 through line 46, valve 47 and into line 14. The solid catalyst particles entering from line 14 are combined with the hydrocarbon feedstock entering the process from line 12 and the cycle is repeated.

Figure 2:
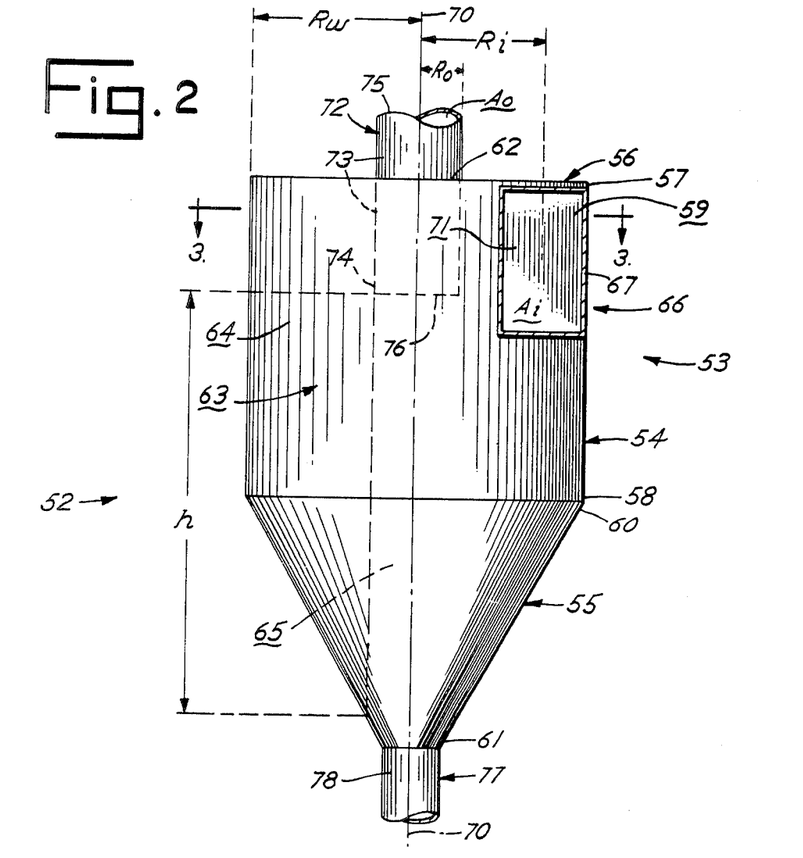
FIG. 2 is a horizontal view of a separation device according to the present invention.
Figure 3:
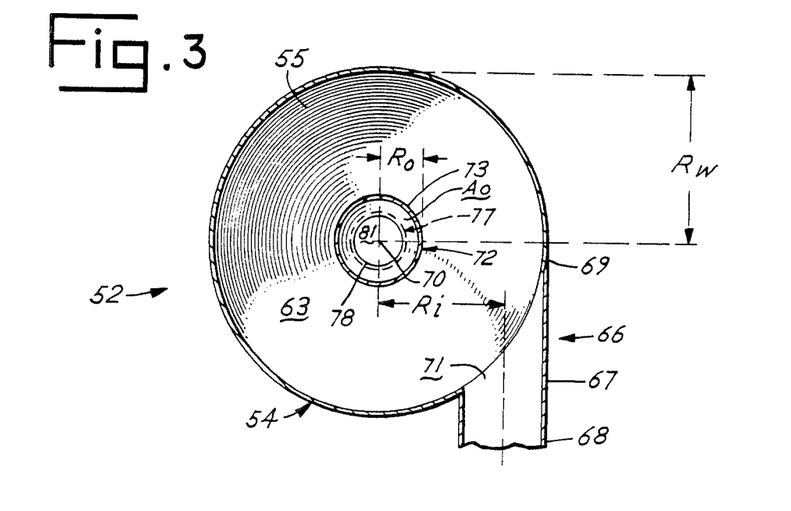
FIG. 3 is a cross-sectional view of the separation device of this invention, taken along lines 3-3 of FIG. 2.

Referring to FIGS. 2 and 3, separator 52 includes a body 53, a fluid inlet 66, a fluid outlet 72 and a particle outlet 77. Body 53 includes an upright cylindrical wall portion 54, a frusto-conical bottom portion 55 and a flat top portion 56. Although a cylindrical body is shown in this preferred embodiment, barrel or other shaped bodies obvious to one of ordinary skill in the art may also be used. The upright cylindrical wall portion 54 includes an upper end 57, a lower end 58 and at least one substantially rectangular opening 59 near the upper end 57. The opening 59 may have a shape other than rectangular, such as circular or elliptical, as is known to one skilled in the art. The frusto-conical portion 55 includes a wide end 60 and a narrow end 61. The wide end 60 is substantially the same size as and is attached to the lower end 58 of the cylindrical wall portion 54. Fluid outlet 72 having a substantially circular opening 62 passes through flat top portion 56 near its center. The cylindrical wall portion 54, the frusto-conical bottom portion 55 and the top portion 56 cooperatively define an enclosed chamber 63 having a central axis 70, a cylindrical upper portion 64 and a tapered lower portion 65. The cylindrical upper and tapered lower portions 64, 65 are concentric with the central axis 70.

The fluid inlet 66 includes an inlet conduit 67 having a first end 68, a second end 69 and an open cross-sectional area. The first end 68 of inlet conduit 67 communicates with the particulate matter/vapor mixture. The second end 69 is connected to the opening 59 near the upper end 57 of the cylindrical wall portion 54, communicating with the chamber 63 to define an inlet opening 71 having a substantially rectangular cross-sectional inlet area, "$A_i$", which is substantially equal to the cross-sectional area of the inlet conduit 67. The inlet conduit 67 extends away from the cylindrical wall portion 54 in a direction substantially tangential to the cylindrical upper portion 64 of chamber 63 and is connected to the cylindrical wall portion 54 such that the inlet opening 71 is positioned at a predetermined inlet radius, "$R_i$", which is equal to the distance between the central axis 70 of said chamber 63 and the centroid of inlet area "$A_i$", e.g., "$R_i$" is equal to the average distance between the central axis 70 and the inlet opening 71.

The fluid outlet 72 includes a substantially cylindrical fluid outlet conduit 73 having a first end 74, a second end 75 and an internal radius, $R_o$. The fluid outlet conduit 73 projects through the substantially circular opening 62 near the center of the top portion 56 of the body 53 and is attached to the top portion 56 such that the first end 74 of the fluid outlet conduit 73 extends into the chamber 63 and is concentric with the central axis 70. The fluid outlet conduit 73 may extend downwardly into the chamber 63 to varying extents. The degree to which the fluid outlet conduit 73 thus extends effects one dimension of the chamber 63 because the height, "h", of the chamber 63 is defined in relation to the first end 74 of the fluid outlet conduit 73 in a manner to be explained later. The fluid outlet conduit 73 at least in part extends axially away from the chamber 63 in a direction substantially parallel with the central axis 70 of said chamber 63. The first end 74 of said fluid outlet conduit 73 communicates with the chamber 63 to define a fluid outlet opening 76 having an outlet radius, "$R_o$", which is equal to the internal radius of the fluid outlet conduit 73. The outlet area "$A_o$" of the fluid outlet opening 75 is simply equal to the cross-sectional area of the fluid outlet conduit 73, or, in this embodiment $\pi R_o^2$.

The particle outlet 77 includes a substantially cylindrical particle outlet conduit 78 having a first end and a second end. The particle outlet conduit 78 extends away from the chamber 63 in a direction substantially parallel and concentric with the central axis 70 of said chamber 63.

Chamber 63 has a height, "h", equal to the distance between the first end 74 of the fluid outlet conduit 73 and that point on the frusto-conical wall 55 which is intersected by an imaginary line substantially parallel to the central axis 70 and extending from the first end 74; and a body radius, "$R_w$", equal to the radial distance from the central axis 70 of said chamber 63 to the interior surface of the cylindrical wall portion 54. If the tapered lower portion 65 of the chamber 63 is a shape other than tapered or frusto-conical, e.g., flat, the height "h" would be equal to the distance of an imaginary line extending from the first end 74 of the fluid outlet conduit 73 along a line substantially parallel to the central axis 70 and ending at the point of its intersection with the bottom portion of the body 53.

The separator or cyclone 52 of this invention is characterized by dimensions and relationships of certain features which do not exist in prior art separators or cyclones. In particular, conventional cyclone theory teaches that cyclone separators should be scaled for high loading conditions according to either the square root of the flow rate (in which case particle attrition is held substantially constant but separation efficiency is lost in larger units) or according to the cube root of the flow rate (in which case separation efficiency is held substantially constant, but attrition is increased in larger units). By way of contrast, this invention provides a separator which avoids the disadvantageous trade-off of efficiency versus attrition and in which both high separation efficiency and low attrition are substantially maintained or improved in larger units.

The dimensions of the features of the present invention are determined at least in part by the desired operating conditions. For example, a cyclone separator intended to process 500 cubic feet of fluid per second will have different dimensions than a cyclone separator intended to process 250 cubic feet of fluid per second, assuming separation efficiency is constant. The present invention identifies relevant cyclone dimensions and operating parameters and their numerical interrelationships required for optimum cyclone operation, i.e. high loading and efficiency with minimization of particle attrition.

The principal operating parameters upon which the design of the present separator 52 is based are: (1) tangential wall velocity, "$V_w$"; (2) volumetric flow rate, "F"; and (3) critical particle size, "D". As previously explained, tangential wall velocity, "$V_w$", refers to the linear velocity of particulate matter within the chamber adjacent the interior surface of the cylindrical wall portion 56; volumetric flow rate, "F", refers to the volumetric rate of flow of the inlet stream mixture through inlet 66, typically expressed in cubic feet per second; and critical particle size, "D", refers to the diameter of a particle which has an equal (50%) chance of exiting either by way of particle outlet 76 or fluid outlet conduit 73.

Also as previously mentioned, it has been found in accordance with this invention that suitably low attrition is achieved when the tangential wall velocity, $V_w$, is maintained at or below about 50 feet per second. For solid particles used to promote hydrocarbon conversion, the tangential wall velocity "$V_w$" is preferably maintained below about 50 feet per second, and generally between about 40 and about 20 feet per second. In the present invention, suitably high separation efficiency (on the order of about 95-99% by weight of solid particles having a diameter greater than about 20 microns) is achieved when the critical particle size is maintained between about 8 and about 12 microns. In a typical application such as the reactor 10 shown in FIG. 1, the first stage separator 20 will operate at a critical particle size of between about 9 and about 12 microns, and the second stage separator 26 will operate at a critical particle size of between about 8 and about 10 microns.

The volumetric flow rate, F, is generally fixed, as a practical matter, at a high volumetric flow rate by predetermined production factors which cannot readily be controlled. Thus, the separator 52 must be able to provide the desired tangential wall velocity "$V_w$" and critical particle size "D" at a given high volumetric flow rate. The present invention is specifically directed toward applications where the volumetric flow rate is between about 200 and about 600 cubic feet per second, preferably between about 200 and about 350 cubic feet per second.

The dimensions of a separator or cyclone 52 for a desired application according to the present invention are defined by the following relationships:

$$R_w = K_i[K_a V_w]^{-1.25}[D\sqrt{d/n}\,]^{-0.727} F^{\frac{3}{2}};$$

$$h = K_h[D\sqrt{d/n}\,]^{-0.323} F^{\frac{3}{2}};$$

$$A_i = K_a[D\sqrt{d/n}\,]^{0.323} F^{\frac{3}{2}};$$

$$R_i = K_i[D\sqrt{d/n}\,]^{-0.323} F^{\frac{3}{2}}; \text{ and}$$

$$R_o = K_o[D\sqrt{d/n}\,]^{0.323} F^{\frac{3}{2}};$$

where:
$K_1$ = about 3.8
$K_a$ = about 0.016
$K_h$ = about 14
$K_o$ = about 0.017 and where "d" is the density of the particulate matter used to promote the chemical conversion and "n" is the viscosity of the particulate matter/vapour mixture.

The relationship between these dimensional features is novel with respect to separators useful in high loading conditions, e.g., in excess of about 200 cubic feed per second. Such novel relationships among the features of the present invention are defined by the following ratios:

(1) $R_i h/R_w^{0.89}$ is less than about 11 ft$^{1.1}$; and preferably less than about 9 ft$^{1.1}$;

(2) $R_i A_i$ is greater than about 16 ft$^3$; and preferably greater than about 19 ft$^3$; and (3) $hA_i$ is greater than about 56 ft$^3$; and preferably greater than about 67 ft$^3$.

Among the unique dimensions of the present separator 52 is that the chamber radius, $R_w$, is larger in relation to other features than is the case with conventional separators. This aspect gives separator 52 a "fat" appearance.

In order to understand how the novel features of the invention effect the operation of the cyclone, it is useful to review the general operation of cyclones. As previously discussed, the fluid inlet 66 cooperates with the body 53 and the fluid outlet 72 to produce vortex flow within the chamber 63. Beginning at the body wall ($R = R_w$), the nature of vortex flow within the cyclone is such that the tangential velocity component "$V_t$" initially increases as "R" decreases. At some intermediate point ($R = R_m$), the tangential velocity component reaches a maximum ($V_t = V_{tm}$). As "R" further decreases from "$R_m$" to zero (at the axis), "$V_t$" also decreases from its maximum "$V_{tm}$" to zero (at the axis). Thus:

$$V_t = V_{tw} \quad (9)$$

when $R = R_w$;

$$V_t \uparrow \text{ as } R \downarrow, \quad (10)$$

where $R_m \leq R \leq R_w$;

$$V_t \downarrow \text{ as } R \downarrow, \quad (11)$$

where $0 \leq R \leq R_m$; and $$V_t = 0 \quad (12)$$

when $R = 0$.

The zone between the axis and the intermediate radius "$R_m$" is called the core of the vortex. According to the present invention, achieving low attrition requires providing low tangential wall velocities, and achieving high separation efficiency requires providing high tangential velocities, both at the fluid inlet opening.

Without limiting the scope of this invention to any theory of operation or use, it is believed that the larger chamber radius "$R_w$" or "fat" body results in a slower moving body of air near the cylindrical wall portion 54. This slower moving body of air acts as an "air cushion", reducing the effective tangential velocity of the particulate matter near the wall, "$V_w$", and thus minimizing attrition by minimizing the collisions between the solid particles and the wall. In contrast to conventional cyclones, wherein an increased chamber radius "$R_w$" results in decreased overall separation efficiency, defining the other critical features according to this invention results in a cooperation with the "$R_w$" factor that maintains or increases separation efficiency.

EXAMPLE

The design of a cyclone separator according to the present invention can be illustrated and compared with prior art designs by the following example, which assumes a high volumetric flow rate, "F", of 316.7 ft$^3$ per second, a desired tangential wall velocity, "$V_w$", of about 40 ft/sec and a critical particle diameter, D, of 10.9 microns. It should be noted that a tangential wall velocity of about 40 ft/sec and a critical particle diameter of 10.9 microns has been found to provide very acceptable levels of low attrition and high separation efficiency in a first stage separation of conventional catalyst particles used to promote hydrocarbon conversion.

The following Table I compares the dimensional and operational characteristics of a separator according to the present invention with a separator of conventional design. The conventional cyclone was manufactured by the Buell Engineering Co. of Lebanon, Pa., Model No. 64AC-350B.

TABLE I

|  | Inventive Design | Conventional Design |
|---|---|---|
| Dimensional Feature | | |
| Inlet gas stream viscosity, poise (n) | 0.0004 | 0.0004 |
| Particulate matter density g/cc (d) | 1.4 | 1.4 |
| Inlet radius, ft ($R_i$) | 3.23 | 3.3 |
| Body radius, ft ($R_w$) | 4.46 | 2.75 |
| Outlet radius, ft ($R_o$) | 0.95 | 0.94 |
| Internal height, ft (h) | 11.56 | 11.8 |
| Inlet area, ft$^2$ ($A_i$) | 6.12 | 6 |
| Operating Characteristic | | |
| Vapor flow rate, ft$^3$/sec (F) | 316.7 | 316.7 |
| Tangential wall velocity, ft/sec ($V_w$) | 40.0 | 58.9 |
| Critical particle diameter, microns (D) | 10.9 | 10.9 |
| Fraction of catalyst converted to sub-20-micron sized fines ($E_u$) | 3.15 × 10$^{-6}$ | 11.4 × 10$^{-6}$ |

The fraction of catalyst which is converted to sub-20 micron sized fines indicates the cyclone's conventionally defined attrition rate, i.e., the fraction of a typical equilibrium catalyst which would be comminuted to less than 20 micron size by collision with the body wall at the operative tangential wall velocity. In the present example, the cyclone of the present invention reduces attrition rate over that of the conventional design judged according to conventional definition by a factor of about 3.6. Even larger reductions in the attrition rate are possible when comparing the cyclone of the present invention to conventional cyclones having initially higher tangential wall velocities.

The following Table II provides a comparison of the dimensional ratios (e.g. as defined by Relationships (1)–(3)) of the separators described in Table I.

TABLE II

| Ratio | Invention Design | Conventional Design |
| --- | --- | --- |
| $R_i h / R_w^{.89}$ | 9.9 ft$^{1.1}$ | 15.8 ft$^{1.1}$ |
| $R_i A_i$ | 19.8 ft$^3$ | 19.8 ft$^3$ |
| $h A_i$ | 70.7 ft$^3$ | 70.8 ft$^3$ |

The difference in dimensions and dimensional ratios shown in Tables I and II are believed to be typical and representative of the differences between a cyclone separator according to the present invention and according to the prior art for a given high loading application.

Figure 4:
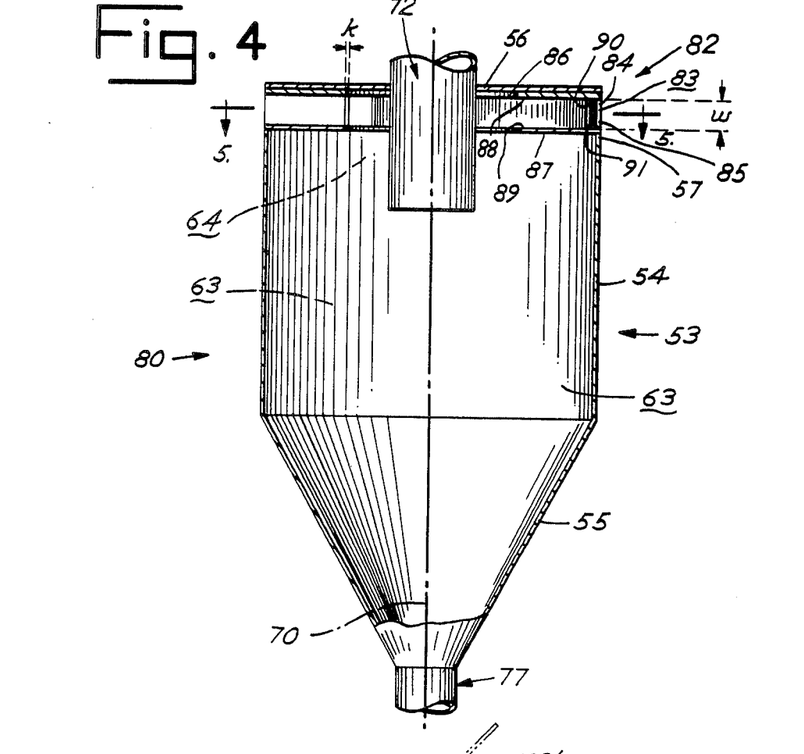
FIG. 4 shows a side elevation in cross-section of a separation device which includes a preferred embodiment of an inlet means according to the present invention.
Figure 5:
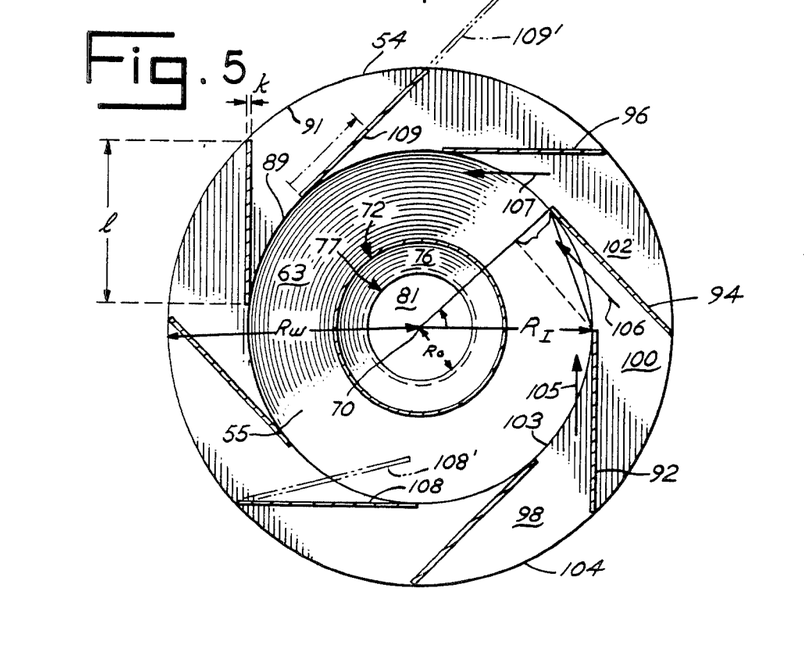
FIG. 5 is a cross-sectional view taken along line 5-5 of FIG. 4.

Separator 52 of the present invention can utilize a variety of inlet designs known to those skilled in the art, e.g., a single tangential inlet 66 as shown in FIGS. 2 and 3, or an axial inlet where the fluid mixture is introduced in a generally downward direction. A particularly preferred inlet 82 is shown, however, in FIGS. 4 and 5 which further minimizes particle attrition while introducing the fluid mixture at a high inlet velocity into a separator, e.g., between about 40 and about 75 feet per second. The separator 80 is substantially similar to separator 52 except for inlet 82. As a result, the items in separator 80, as shown in FIGS. 4 and 5, will be identified in the same manner as the items in separator 52 of FIGS. 2 and 3, except for the inlet 82. Referring to FIGS. 4 and 5, the inlet 82 includes a top annular plate 86, a bottom annular plate 87, a plurality of substantially vertical plates or inlet vanes, as identified hereinafter, and an upright cylindrical wall portion 54 of body 53.

The upright cylindrical wall portion 54 of separator 80 as illustrated in FIG. 5 has a cylindrical circumference and an opening around the circumference near the upper end 57 thereby defining a substantially cylindrical opening 83 to the chamber 63 within the cylindrical wall portion 54. The cylindrical opening 83 has a top edge 84 and a bottom edge 85.

Top and bottom solid annular plates 86 and 87 have inner edges 88, 89, respectively, an inner radius, "$R_I$", outer edges 90, 91, respectively, and an outer radius which is substantially equal to said chamber radius, "$R_w$". The top and the bottom annular plates 86, 87 are each preferably positioned within the upper cylindrical portion 64 of the chamber 63 parallel to the flat top portion 56 of the body 53. More specifically, the outer edge 90 of the upper plate 86 is preferably adjacent to the top edge 84 of the cylindrical opening 83 and forms a first interface therewith, and the outer edge 91 of the lower plate 87 is adjacent to the bottom edge 85 of the cylindrical opening 83 to form a second interface therewith. The upper and lower plates 86, 87 are attached to the cylindrical wall portion 54 such that a seal is formed along the first and second interfaces. The upper and lower annular plates 86, 87 define an annular or doughnut shaped space within the chamber 63 which is in communication with the cylindrical opening 83 in the cylindrical wall portion 54. The annular shaped space in chamber 63 further communicates through a conventionally designed collar and inlet conduit (not shown) to a fluid intake, such as the conduit inlet 22 shown in FIG. 1, which supplies the particulate matter/vapor mixture.

The operation of inlet 82 will be explained by specific reference to the three inlet plates or vanes 92, 84, and 96, as shown in FIG. 5. It is to be understood, however, that all of the inlet vanes are preferably substantially similar in design, and they function in a substantially similar manner.

The plurality of substantially rectangular plates or inlet vanes 92, 94 and 96 have a predetermined axial width, "w", axial length, "l", and axial thickness, "k", and are positioned symmetrically within the annular shaped space about the central axis 70 of said chamber 63 such that the axial width "w" extends between the upper and lower annular plates, 86, 87; the axial length "l" extends between the inner edges 88, 89 and the outer edges 90, 91 of the annular plates 86, 87 in a direction which is substantially perpendicular to the inner radius, "$R_I$, of the annular plates 86, 87 and the axial thickness is substantially parallel to the inner radius "$R_I$" on the inner edges 88, 89 of the upper and lower annular plates 86, 87.

The plurality of rectangular plates 92, 94 and 96 are preferably positioned in a substantially symmetrical and circular configuration about the chamber and divide the annular space into a plurality of passageways 98, 100, 102 which are, therefore, also preferably symmetrically positioned about the central axis 70. The circular configuration has a radius which is preferably at least twice the fluid outlet radius "$R_o$". The plurality of passageways 98, 100, 102, have a narrow arcuate inner end (e.g., see inner end 103 of passageway 98) in communication with the chamber 63 and a wide arcuate outer end (e.g., see outer end 104 of passageway 98) in communication with the collar and conduit (not shown) and the first fluid stream mixture. The inner end 103 defines an inlet opening positioned at a distance from the central axis 70 of the chamber 63 equal to "$R_I$". It should be noted that "$R_i$" of Relationships (1)–(8) equals "$R_I$"+("W"/2), where "W" is discussed hereinafter.

The distance separating any two adjacent vanes is preferably given by the relationship:

$$W = R_I [1 - \cos(360/N)],$$

where "N" equals the number of inlet vanes. The total inlet area $A_I$ is therefore:

$$A_I = NWR_1[1 - \cos(360/N)].$$

("$A_I$" equals "$A_i$" of Relationships (1)–(8).)

The plurality of passageways 98, 100, 102 divide the first fluid stream mixture into a plurality of high velocity inlet streams (indicated in FIG. 5 by arrows 105, 106, 107) and introduce the inlet streams 105, 106, 107 into the chamber 63 at a plurality of locations symmetrically positioned about the central axis 70 of the chamber 63 at a distance, "$R_I$," from the central axis 70. The passageways 98, 100, 102 can comprise any suitable structure which provides means for introducing a fluid stream into a chamber, for example, channels or conduits. More preferably, as shown herein, the vertical wall portions of such passageways comprise vanes, and the top and bottom portions can comprise any suitable enclosing structures, for example, arcuate or flat surfaces. Each inlet stream 105, 106, 107 is introduced in a direction which is substantially perpendicular to the chamber radius "$R_w$" and substantially tangential to the chamber 63. Each inlet stream deflects another inlet stream away from the body and the inlet vanes and is, in turn, itself deflected away from the body and the inlet vanes by another inlet stream. For example, inlet stream 106 intersects and deflects inlet stream 105 just prior to the location at which inlet stream 105 would otherwise impinge inlet vane 94, and inlet stream 106 is intersected and deflected by inlet stream 107 just prior to the location at which stream 106 would otherwise impinge inlet vane 96. The inlet streams 105, 106, 107, cooperate in this manner to introduce the first fluid stream mixture into the chamber 63 at a high rate of velocity, increasing the centrifugal forces and separation efficiency, while simultaneously reducing collision between the solid particles of the mixture and any surfaces of the cyclone apparatus, thereby minimizing attrition attributable to the fluid inlet 82.

Another advantage of the design of fluid inlet 82 is that it facilitates centering of the vortex within the chamber 63. That is, since the particulate matter/vapor mixture is introduced as a plurality of inlet streams located symmetrically about the center axis 70 and since the plurality of inlet streams co-act by deflection of one another to produce a generally circular flow pattern, which is itself centered about axis 70, the resulting vortex tends also to be well centered within the chamber 63. Alternatively, offsetting the vortex with respect to the center axis 70, if desired, could be facilitated by positioning all of the inlet vanes such that the inlet openings are offset a predetermined distance with respect to the center axis 70.

The angle of deflection of the inlet streams 105, 106, 107 is an important factor in the efficiency of the inlet 82 in minimizing attrition. Generally, the smaller the angle of deflection, the more effective are the inlet streams 105, 106, 107 in deflecting one another and preventing impingment and attrition. As a result, inlet 82 also avoids turbulence, which is a disruptive factor to vortex formation. In other words, the more incremental the deflection, the more efficient the inlet 82.

The angle of deflection 82 can be adjusted in several ways. For example, the number of primary inlet vanes 92, 94, 96 positioned symmetrically about the axis 70 can be increased, which will reduce the angle of deflection. Similarly, the primary inlet vanes 92, 94, 96 can be repositioned directly such that they are angled more inwardly or outwardly (compare, for example, inlet vanes 108 and 108' in FIG. 5). It should be noted however, that the latter technique will also change the inlet radius "$R_f$" and the inlet area "$A_f$" which will directly effect operation of the cyclone of this invention. Since the inlet radius "$R_f$" and inlet "$A_f$" in connection with this invention are calculated in relation to the desired operating parameters and the inlet 82 must be designed accordingly, the preferred technique for adjusting the angle of deflection in accordance with this invention is to increase or decrease the number of inlet vanes.

The inlet radius "$R_f$" and the inlet area "$A_f$" may be adjusted, as desired, by several different techniques. One such technique, as described above, is to reposition the inlet vanes 105, 106, 107 such that they are angled more inwardly or outwardly. Alternatively, the axial length, "l", of the inlet vanes 105, 106, 107 can be shortened, or the inlet vanes can be repositioned to extend outside of the upright cylindrical wall portion 54. (Compare, for example, inlet vanes 109 and 109' shown in FIG. 5.) The inlet 82 could be designed, for example, with the vanes 92, 94, 96 being positioned entirely outside of the chamber 63, such that the narrow end 103 of passageway 98 communicates with the chamber 63 at the cylindrical opening 83 in upright cylindrical wall portion 54, (e.g., "$R_f$" would equal "$R_w$".)

The top and bottom annular places 86, 87 can alternatively be made frusto-conical in contrast to the substantially flat design shown in FIG. 4. In this way the inlet streams 105, 106, 107 have a downward directional component as well as tangential component, facilitating vortex formation.

Figure 6:
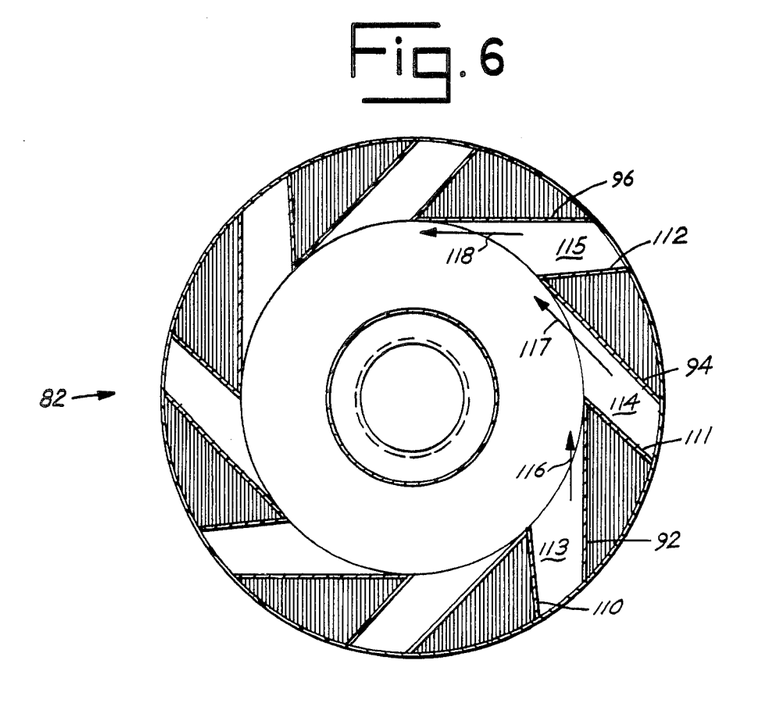
FIG. 6 is a cross-sectional view similar to FIG. 5 but showing an alternative embodiment of the inlet of the present invention.

Referring to FIG. 6, the inlet 82 is shown in an alternative embodiment which includes a plurality of secondary vanes, each secondary vane being substantially parallel to and associated with one primary inlet vane. Except for the secondary vanes and the inlet passages, the inlet shown in FIG. 6 is substantially identical to the inlet 82 shown in FIG. 5. The present embodiment will be explained by reference to secondary inlet vanes 110, 111, and 112 which are associated with primary inlet vanes 92, 94 and 96 respectively. It is to be understood, however, that the remaining secondary vanes are designed and function in a substantially similar manner.

The secondary vanes 110, 111, and 112 are preferably substantially parallel to and cooperate with the primary inlet vanes 92, 94, and 96, respectively, to define guides or inlet passages 113, 114, 115 of substantially uniform size along a predetermined length and a non-functional area therebetween (indicated by shading in FIG. 6). The guides or inlet passages 113, 114, 115 define means for accelerating the inlet stream associated with the inlet vane to a predetermined inlet velocity before introducing the inlet stream into the chamber. This design is, in effect, similar to placing a plurality of inlets such as inlet 66 shown in FIG. 3 symmetrically about the chamber 63. Alternatively, the secondary vanes 110, 111, 112 may be placed transverse to the inlet vanes 92, 94, 96, to form a converging inlet which continually increases the velocity of the inlet stream similar to the passageways 98, 100, 102 shown in FIG. 5. The parallel placement of the secondary vanes is preferred in this embodiment because it provides inlet streams 116, 117, 118 which achieve a constant desired velocity prior to entering the chamber 63. Constant velocity allows the inlet streams 116, 117, 118 and entrained gas particles to achieve a smooth, non-turbulant flow pattern and to enter the cyclone with as little disruption as possible of the existing flow pattern within the chamber 63. Since the inlet streams 116, 117, 118 achieve a smooth, non-turbulent flow, they are believed highly effective in deflecting the adjacent inlet streams and reducing attrition attributable to the inlet 82.

Figure 7:
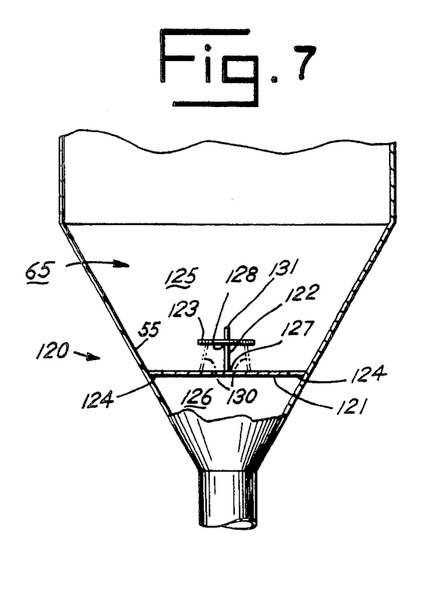
FIG. 7 is a horizontal view in partial cross-section showing the lower interior portion of the separation device according to the present invention and the relationship of a vortex reflector device thereto.

Referring now to FIG. 7, another aspect of a separation device of the present invention comprises a vortex reflecting device 120 which includes a plate 121, a support rod 122, and a reflecting disk 123.

Plate 121 having a plurality of holes 124 near its outer edge is positioned horizontally within the lower tapered portion 65 of the chamber 63 and is attached to the frusto-conical wall portion 55 along the outer edge of the plate 121, thereby effectively dividing the chamber 63 into a separation zone 125 and a collection zone 126. The separation zone 125 (e.g., in which the vortex is located) communicates with the fluid inlet 66 and the fluid outlet 72 in substantially the same manner as previously explained for FIGS. 1-5. Those aspects of the device which have been explained elsewhere will be referred to by their previous numbers, although they will not be repeated in FIG. 6 for purposes of simplicity. The collection zone 126, in turn, communicates with the particle outlet 77. The plate 121 is preferably substantially solid, except for holes 124, to prevent the vortex from entering the collection zone 126. Moreover, the plate 121 is preferably circular in shape to best fit into the tapered lower portion 65 of the chamber 63. Other shapes, e.g. hexagonal or frusto-conical, known to one skilled in the art may also be used. The holes 124 in the plate 121 define passageways from the separation zone 125 to the collection zone 126, thereby allowing the solid particles that have collected along the interior surface of the cylindrical and frusto-conical wall portions 54, 55 to drift downward and to pass from the separation zone 125 into the collection zone 126, and, ultimately, out of the particle outlet 77.

Although the holes 124 may be located slightly inward from the edge of the plate 121, they are preferably located as near the edge as possible. The particularly preferred location for holes 124 are notches around the edge. In this way, the solid particles can drift downward while near the wall. As a result, they do not have to migrate toward the central axis 70 where they might be entrained by the vortex and carried out the particle outlet 77.

The support rod 122, having a first end 127 and a second end 128 is located within the separation zone 125. The first end 127 of the support rod 122 is attached to the center of the substantially solid circular plate 121. The rod 122 extends from the plate 121 toward the fluid outlet opening 72 in a direction substantially parallel to said central axis 70 of said chamber 63.

The reflecting disk 123 has a first side and a second side and is mounted upon the support rod 122 such that the second end 128 of the support rod 122 is secured to the center of the first side of the reflecting disk 123. In this way, the reflecting disk 123 is centrally mounted within the chamber 63 and, preferably, is centrally located with respect to the vortex. This arrangement is preferred as the most effective design to reflect the vortex. The reflecting disk 123 is preferably solid, circular and flat for the same reasons as explained in connection with the plate 121. The reflecting disk 123 has a disk radius which is at least as large as the fluid outlet radius, preferably twice as large, so that the reflecting disk 123 effectively prevents the vortex from extending below the disk. When the reflecting disk 123 is so designed as to prevent the vortex from extending below the disk, the reflecting disk functions as the bottom floor of the separator, i.e., for purposes of defining "h" as shown in FIG. 2, the height "h" would be equal to the average distance from the fluid outlet 76 to the reflecting disk 123.

The centering plate 121, support rod 122 and the reflecting disk 123 cooperate to define the vortex reflecting device 120 which prevents re-entrainment of particulate matter that has once been effectively separated from the vapor. Without the vortex reflecting device 120, particulate matter which has drifted downward into the tapered lower portion 65 of the chamber 63 has a tendency to be picked up by the vortex and re-entrained in the fluid outlet stream. Even if the circular plate 121 is utilized without the reflecting disk 123 particulate matter tends to drift inward along the plate 121 toward the vortex, ultimately to be carried out the fluid outlet 72. The reflecting disk 123 used in conjunction with the primary plate 121 defines a dead zone therebetween. The vortex does not enter this dead zone, and there is no vapor flow in the dead zone sufficient to cause re-trainment of the particulate matter. More efficient vortex reflection and particle separation results.

The reflecting disk 123 may be mounted on the plate 121 by arrangement other than a single supporting rod 122. For example, a plurality of braces 130 provide an alternative tripod support structure (shown in FIG. 6 by dotted lines). Alternately, the supporting rod 122 could comprise a spring mechanism (not shown). This latter arrangement would have the advantage of permitting the reflecting disk 123 to move along with the vortex in response to dynamic conditions within the chamber. For example, if the vortex shifted temporarily to one side, or increased in intensity, the spring mechanism 122 would allow the reflecting disk to shift from side to side or to move toward or away from the fluid outlet to counteract the changing conditions. Importantly, however, the reflecting disk 123 as mounted above the primary plate 121 should not be mounted in a manner that would interfere with the vortex or the flow patterns within the separation zone 125. For example, interference would result if the reflecting disk 123 were supported from the top wall portion 56 by rods which extend through the core of the vortex. Thus the preferred arrangement is to support the reflecting disk 123 from its underside.

The vortex reflector 120 may further include a vortex centering device for adjusting the position of a vortex within the chamber. The vortex centering device comprises an elongated centering member 131 such as cylindrical or cigar-shaped projection having a first end and a second end. The first end of the elongated member or centering rod 131 is attached to the second side of the reflecting disk 123 at the center thereof and extends upward therefrom toward the fluid outlet 72 into the center of the vortex. The centering rod 131 helps to center and to adjust the position of the vortex within the separation zone 120 of the chamber 63. As a result, the flow of the vortex about the centering rod 131 creates resistance forces which are at a minimum when the rod 131 is centered in relation to the vortex. If the vortex moves such that the centering rod 131 becomes off center with respect to the vortex, the resistance forces increase. The vortex will tend to remain centered with respect to the centering rod so as to minimize these resistance forces. In particular, locating the centering rod 131 in the center of the reflecting disk helps to maintain the vortex in a position directly over the reflecting disk 123, thereby facilitating formation of the dead zone between primary plate 121 and reflecting disk 123.

Figure 8:
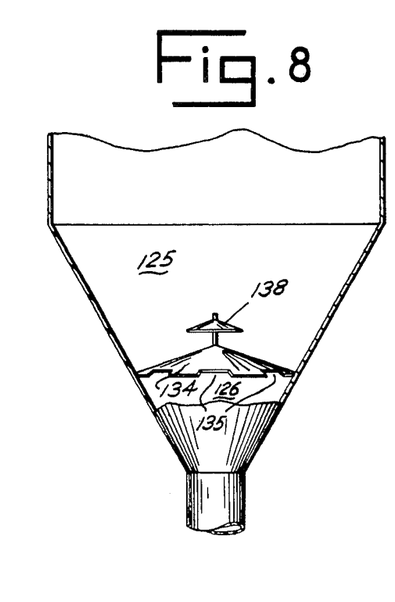
FIG. 8 is similar to FIG. 7 sub shows an alternative embodiment of the vortex reflector device of this invention.

The plate 121, which was shown as a substantially flat disk in FIG. 7, may alternatively comprise a conical shaped primary plate 134 as shown in FIG. 8. The conical shaped primary plate 134 is substantially similar to the primary plate 121 of FIG. 7 except for the conical shape. The conical shape provides "gravity-assist" forces to direct separated particulate matter through the openings 135 near the edge of the plate 134, into the collection zone 126 and out of particle outlet 77. Also as shown in FIG. 8, the reflecting disk 138 may be of conical, hemispherical or other shapes known to one skilled in the art.

It is to be understood that the foregoing description relates to specific embodiments and that alternative embodiments and modifications of the present device are possible without departing from the intended scope of the invention.

What is claimed is:

1. In an apparatus for separating solid particles from a first fluid stream which includes a mixture of vapor and said particles, said apparatus including a body that defines a chamber defined by an interior cylindrical surface, inlet means for introducing said first fluid stream mixture into said chamber, fluid outlet means for withdrawing a second fluid stream substantially free of said particles from said chamber, and particle outlet means for withdrawing at least a portion of said particles that has been separated from said mixture in said chamber, the improvement comprising: said inlet means comprising a plurality of inlet passageway means wherein each said inlet passageway means is a means for conducting an inlet stream associated therewith along a substantially straight path tangentially into said chamber to induce said particles contained therein to move toward said interior cylindrical surface, said plurality of inlet passageway means is situated such that said path of one inlet stream will impinge upon the path of a downstream inlet stream associated with a downstream inlet passageway means to induce said particles contained in the impinging stream to be deflected away from said cylindrical surface; whereby said mixture is introduced into said chamber at a high velocity while reducing contact of said solid particles with said cylindrical surface so as to maintain separation efficiency while decreasing particle attrition.

2. The apparatus of claim 1 wherein the plurality of passageway means comprises at least three passageway means.

3. The apparatus of claim 1 wherein the plurality of passageway means comprises at least four passageway means.

4. The apparatus of claim 1 wherein the plurality of passageway means comprises between about five and about twelve passageway means.

5. The apparatus of claim 1, 2, 3 or 4 wherein the plurality of passageways comprise a plurality of uncurved primary vane means.

6. The apparatus of claim 5 wherein said plurality of passageway means further comprise a plurality of secondary vanes, each said secondary vane cooperating with at least one of said primary vane means to define at least one of said passageway means.

7. The apparatus of claim 6 wherein each of said secondary vanes is substantially parallel to at least one of said primary vane means.

8. The apparatus of claim 5 wherein said primary vane means are positioned in a substantially symmetrical configuration about said chamber.

9. The apparatus of claim 1 wherein the solid particle size ranges from about 8 to about 12 microns.

10. The apparatus of claim 1 wherein the radius of said chamber is between 4 and 10 feet and the height of said chamber ranges from about 4 feet to about 50 feet.

11. The apparatus of claim 1 wherein the product of the chamber height and the inlet area of each said passageway means is greater than about 56 cubic feet.

12. The apparatus of claim 11 wherein the product of said chamber height and said inlet area is greater than about 67 cubic feet.

13. The apparatus of claim 1 wherein the radius of said chamber is selected such that the tangential wall velocity of the mixture is less than 50 feet per second.

14. The apparatus of claim 13 wherein the radius of said chamber is selected such that the tangential wall velocity of the mixture is between 20 and 40 feet per second.

15. The apparatus of claim 13 wherein the inlet fluid flow rate is between 200 and 600 cubic feet per second.

16. The apparatus of claim 15 wherein the radius of said chamber is selected such that the tangential wall velocity of the mixture is between 20 and 40 feet per second.

17. The apparatus of claim 1 wherein the inlet area of each of the passageway means is between about 4 and about 12 square feet and the inlet radius of each said passageway means is between about 2.5 and about 7 feet, and the outlet radius is between about 0.5 and about 2 feet.

18. The apparatus of claim 17 wherein said inlet radius, $R_i$, the chamber height, $h$, and the chamber radius, $R_w$, are selected so that the following formula is satisfied:

$$(R_ih/R_w)^{0.89} < 11(ft)^{1.1}.$$

19. The apparatus of claim 18 wherein $R_i$, $h$ and $R_w$ are selected so that the following formula is satisfied:

$$(R_ih/R_w)^{0.89} < 9(ft)^{1.1}.$$

20. The apparatus of claim 17 wherein the product of said inlet radius and said inlet area is greater than about 16 cubic feet.

21. The apparatus of claim 20 wherein the product of said inlet radius and said inlet area is greater than about 19 cubic feet.

* * * * *

UNITED STATES PATENT AND TRADEMARK OFFICE
CERTIFICATE OF CORRECTION

PATENT NO.   : 4,486,207
DATED        : December 4, 1984
INVENTOR(S)  : Lloyd A. Baillie It is certified that error appears in the above-identified patent and that said Letters Patent are hereby corrected as shown below:

Column 9, line 63, delete "in" and insert in place thereof -- is --.

Column 15, line 21, delete "$K_1$" and insert in place thereof -- $K_i$ --.

Column 23, claim 5, line 2, delete "passageways" and insert in place thereof -- passageway means --.

Signed and Sealed this

Ninth Day of July 1985

[SEAL]

Attest:

DONALD J. QUIGG

Attesting Officer     Acting Commissioner of Patents and Trademarks